(12) United States Patent
Ashworth

(10) Patent No.: US 7,311,756 B2
(45) Date of Patent: Dec. 25, 2007

(54) FANLESS INDOOR AIR QUALITY TREATMENT

(75) Inventor: Nicholas Ashworth, Dublin, OH (US)

(73) Assignee: Ranco Incorporated of Delaware, Wilmington, DE (US)

( * ) Notice: Subject to any disclaimer, the term of this patent is extended or adjusted under 35 U.S.C. 154(b) by 40 days.

(21) Appl. No.: 11/288,847

(22) Filed: Nov. 29, 2005

(65) Prior Publication Data

US 2006/0112829 A1    Jun. 1, 2006

Related U.S. Application Data

(60) Provisional application No. 60/632,333, filed on Nov. 30, 2004.

(51) Int. Cl.
*B03C 3/019* (2006.01)
(52) U.S. Cl. .......... 95/70; 95/4; 95/73; 95/74; 96/19; 96/39; 96/55; 96/63; 96/74
(58) Field of Classification Search .......... 96/18, 96/19, 24, 25, 30, 31, 55, 74, 96, 97, 39, 96/63; 95/2–4, 7, 70, 73, 74; 361/230–235; 454/237
See application file for complete search history.

(56) References Cited

U.S. PATENT DOCUMENTS

| 2,765,975 | A |   | 10/1956 | Lindenblad |
|---|---|---|---|---|
| 2,795,401 | A | * | 6/1957 | Cooper et al. .......... 165/5 |
| 3,503,348 | A |   | 3/1970 | Dvirka |
| 3,504,482 | A |   | 4/1970 | Goettl |
| 3,638,058 | A |   | 1/1972 | Fritzius |
| 3,699,387 | A |   | 10/1972 | Edwards |
| 3,751,715 | A |   | 8/1973 | Edwards |
| 3,930,611 | A |   | 1/1976 | Demaray |
| 3,973,927 | A | * | 8/1976 | Furchner et al. .......... 95/3 |
| 4,076,011 | A |   | 2/1978 | Proulx |
| 4,210,847 | A |   | 7/1980 | Shannon et al. |
| 4,231,766 | A |   | 11/1980 | Spurgin et al. |
| 4,282,591 | A |   | 8/1981 | Andreuccetti |
| 4,288,990 | A |   | 9/1981 | Schulz |
| 4,343,776 | A |   | 8/1982 | Carr et al. |

(Continued)

FOREIGN PATENT DOCUMENTS

CA    2117222    9/1995

(Continued)

OTHER PUBLICATIONS

The Sharper Image, SI857 OzoneGuard Professional Series Ionic Breeze Quadra Silent Air Purifier, pages printed from website, date last visited Nov. 14, 2005, 5 pages, http://www.sharperimagebest,com/si857.html.

(Continued)

*Primary Examiner*—Richard L. Chiesa
(74) *Attorney, Agent, or Firm*—Reinhart Boerner Van Deuren P.C.

(57) ABSTRACT

An indoor air quality system for a structure is provided. The indoor air quality system includes a ventilation system and a corona discharge apparatus. The ventilation system directs air through the structure. The corona discharge apparatus is positioned within the ventilation system and is operable to filter the air and to move the air through the ventilation system.

20 Claims, 2 Drawing Sheets

U.S. PATENT DOCUMENTS

| | | | |
|---|---|---|---|
| 4,380,720 A | 4/1983 | Fleck | |
| 4,405,507 A | 9/1983 | Carr et al. | |
| 4,462,540 A | 7/1984 | Dytch | |
| 4,643,745 A | 2/1987 | Sakakibara et al. | |
| 4,675,029 A | 6/1987 | Norman et al. | |
| 4,694,817 A | 9/1987 | Nilsson | |
| 4,789,801 A | 12/1988 | Lee | |
| 4,812,711 A * | 3/1989 | Torok et al. | 315/111.91 |
| 4,955,991 A * | 9/1990 | Torok et al. | 96/50 |
| 4,969,508 A | 11/1990 | Tate et al. | |
| 5,042,997 A | 8/1991 | Rhodes | |
| 5,055,115 A * | 10/1991 | Yikai et al. | 96/59 |
| 5,071,455 A | 12/1991 | Abedi-Asl | |
| 5,077,500 A | 12/1991 | Török et al. | |
| 5,082,173 A | 1/1992 | Poehlman et al. | |
| 5,144,941 A | 9/1992 | Saito et al. | |
| 5,271,558 A | 12/1993 | Hampton | |
| 5,272,477 A | 12/1993 | Tashima et al. | |
| 5,422,331 A | 6/1995 | Galligan et al. | |
| 5,595,342 A | 1/1997 | McNair et al. | |
| 5,667,564 A | 9/1997 | Weinberg | |
| 5,702,244 A | 12/1997 | Goodson et al. | |
| 5,803,357 A | 9/1998 | Lakin | |
| 5,833,134 A | 11/1998 | Ho et al. | |
| 5,924,486 A | 7/1999 | Ehlers et al. | |
| 5,958,112 A * | 9/1999 | Nojima | 96/55 |
| 6,116,512 A | 9/2000 | Dushane et al. | |
| 6,129,781 A * | 10/2000 | Okamoto et al. | 96/25 |
| 6,176,977 B1 | 1/2001 | Taylor et al. | |
| 6,213,404 B1 | 4/2001 | Dushane et al. | |
| 6,287,368 B1 * | 9/2001 | Ilmasti | 96/19 |
| 6,375,902 B1 | 4/2002 | Moini et al. | |
| 6,375,905 B1 | 4/2002 | Moini et al. | |
| 6,449,533 B1 | 9/2002 | Mueller et al. | |
| 6,464,754 B1 * | 10/2002 | Ford | 95/26 |
| 6,504,308 B1 | 1/2003 | Krichtafovitch et al. | |
| 6,508,982 B1 * | 1/2003 | Shoji | 422/22 |
| 6,513,723 B1 | 2/2003 | Mueller et al. | |
| 6,635,106 B2 * | 10/2003 | Katou et al. | 96/67 |
| 6,664,741 B1 | 12/2003 | Krichtafovitch | |
| 6,699,529 B2 | 3/2004 | Garner et al. | |
| 6,727,657 B2 | 4/2004 | Krichtafovitch et al. | |
| D499,476 S | 12/2004 | Holderfield et al. | |
| D500,848 S | 1/2005 | Holderfield et al. | |
| D501,042 S | 1/2005 | Holderfield et al. | |
| 6,920,874 B1 | 7/2005 | Siegel | |
| 2001/0032544 A1 * | 10/2001 | Taylor et al. | 96/19 |
| 2001/0048030 A1 | 12/2001 | Sharood et al. | |
| 2003/0024487 A1 | 2/2003 | Hughes | |
| 2003/0090209 A1 | 5/2003 | Krichtafovitch et al. | |
| 2003/0234618 A1 | 12/2003 | Krichtafovitch | |
| 2004/0004440 A1 | 1/2004 | Krichtafovitch et al. | |
| 2004/0004797 A1 | 1/2004 | Krichtafovitch et al. | |
| 2004/0133314 A1 | 7/2004 | Ehlers et al. | |
| 2004/0155612 A1 | 8/2004 | Krichtafovitch | |
| 2004/0183454 A1 | 9/2004 | Krichtafovitch | |
| 2004/0212329 A1 | 10/2004 | Krichtafovitch et al. | |
| 2004/0217720 A1 | 11/2004 | Krichtafovitch et al. | |
| 2005/0011512 A1 | 1/2005 | Bachinski et al. | |
| 2005/0043907 A1 | 2/2005 | Eckel et al. | |
| 2005/0194457 A1 | 9/2005 | Dolan | |
| 2005/0214186 A1 | 9/2005 | Michalakos et al. | |
| 2006/0112708 A1 | 6/2006 | Reaves | |
| 2006/0112828 A1 | 6/2006 | Ehlers | |
| 2006/0112955 A1 | 6/2006 | Reaves | |
| 2006/0113398 A1 | 6/2006 | Ashworth | |
| 2006/0114637 A1 | 6/2006 | Ashworth | |
| 2006/0125648 A1 | 6/2006 | Young | |

FOREIGN PATENT DOCUMENTS

| | | | |
|---|---|---|---|
| CA | 2370966AA | 12/2000 | |
| JP | 61134524 A | 6/1986 | |
| JP | 362057662 A | 3/1987 | |
| JP | 63201437 A | 8/1988 | |
| JP | 01312340 A | 12/1989 | |
| JP | 02215037 A | 8/1990 | |
| JP | 4-55121 * | 2/1992 | 95/73 |
| JP | 410043628 A | 2/1998 | |

OTHER PUBLICATIONS

YET2.COM, NoZone The Intelligent Air Freshener, pages printed from website, date last visited Nov. 14, 2005, 2 pages, http://www.yet2.com/app/list/techpak?id=36127&sid=360&abc-0.

Engelhard, PremAir catalyst now part of The Sharper Image's Ionic Breeze Air Purifiers, page printed from website, date last visited Nov. 14, 2005, http://www.engelhard.com/Lang1/xDocID1EF8CDE1FB754A8788E84A989F41EA6C/xDocTable_Cas.

Lara A. Gundel, Douglas P. Sullivan, Gregory Y. Katsapov, William J. Fisk, A pilot study of energy efficient air cleaning for ozone, report, Indoor Environment Department Environmental Energy Technologies Division Lawrence Berkeley National Laboratory, University of California, Nov. 28, 2002, 15 pages, posted at the eScholarship Repository, University of California, http://repositories.cdlib.org/lbnl/LBNL-51836.

Theta Engineering, "Smart" Thermostat, website, date last visited Oct. 26, 2006, previously visited Oct. 27, 2005, 3 pages, http://www.thetaeng.com/SmartThermostat.htm.

* cited by examiner

FANLESS INDOOR AIR QUALITY TREATMENT

This patent application claims the benefit of U.S. Provisional Patent Application No. 60/632,333, filed Nov. 30, 2004, the teachings and disclosure of which are hereby incorporated in their entireties by reference thereto.

FIELD OF THE INVENTION

This invention generally relates to heating, ventilating, and air conditioning (HVAC) systems, and more particularly to HVAC systems that provide filtering and dehumidification to improve indoor air quality (IAQ).

BACKGROUND OF THE INVENTION

In newly constructed homes, modern energy-saving building materials are utilized extensively. While this is beneficial from a natural resource perspective, it has a potentially negative impact on the air quality within the home. The well-insulated and sealed home that keeps outside ambient air outside, and conditioned air inside, also prevents household pollutants from escaping. Consequently, this can lead to sick building syndrome and problems for allergy suffering occupants.

To address these problems, current HVAC systems utilize fans or blowers and disposable filters (e.g., high efficiency particulate absorbing (HEPA) filters) to move and clean air within a dwelling or structure. Unfortunately, such a system has a high cost of ownership because of the cost of the filters, which must be periodically replaced, and because of the cost of running and repairing the fans. Further, most filter media does a relatively poor job at cleaning the air of many of the particles and odors that decrease the indoor air quality.

Therefore, an indoor air quality system that can efficiently and cost effectively clean and circulate air through a structure would be desirable. The invention provides such an indoor air quality system. These and other advantages of the invention, as well as additional inventive features, will be apparent from the description of the invention provided herein.

BRIEF SUMMARY OF THE INVENTION

The invention provides a new and improved HVAC system. More particularly, the invention provides a new and improved HVAC system that utilizes corona-based technology for air movement thereby eliminating the need for a fan. Further, the invention provides a new and improved HVAC system that utilizes the corona-based technology for air cleaning without the need for a conventional filter. Still further, the invention provides a new and improved HVAC system that utilizes the corona-based technology for dehumidification of the air without the need for a conventional dehumidifier. As such, the system of the invention provides a single solid-state product that will provide air flow, purification, and dehumidification. This is novel because existing implementations of central IAQ systems utilize fans and various filtration media to move air and improve the air quality.

In one aspect, the invention provides an indoor air quality system for a structure. The indoor air quality system comprises a ventilation system and at least one corona discharge apparatus. The ventilation system directs air through the structure. The at least one corona discharge apparatus is positioned within the ventilation system and is operable to filter the air and to move the air through the ventilation system.

In another aspect, the invention provides an indoor air quality system for a structure. The indoor air quality system comprises a ventilation system and a corona discharge apparatus. The ventilation system includes a duct extending to an outside air intake. The outside air intake is capable of receiving fresh air from outside the structure. The corona discharge apparatus is positioned within the ventilation system and is operable to draw the fresh air from outside the structure and stale air from inside the structure into the ventilation system, to filter the fresh air and the stale air to produce filtered air, and to move the filtered air through the ventilation system.

In yet another aspect, the invention provides a method of improving air quality in a structure. The method comprises the steps of drawing fresh air into the structure using a corona discharge apparatus, filtering the fresh air with the corona discharge apparatus to remove at least one of contaminants and pollutants to produce filtered air, and circulating the filtered air through the structure with the corona discharge apparatus. As such, the air quality in the structure is improved.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
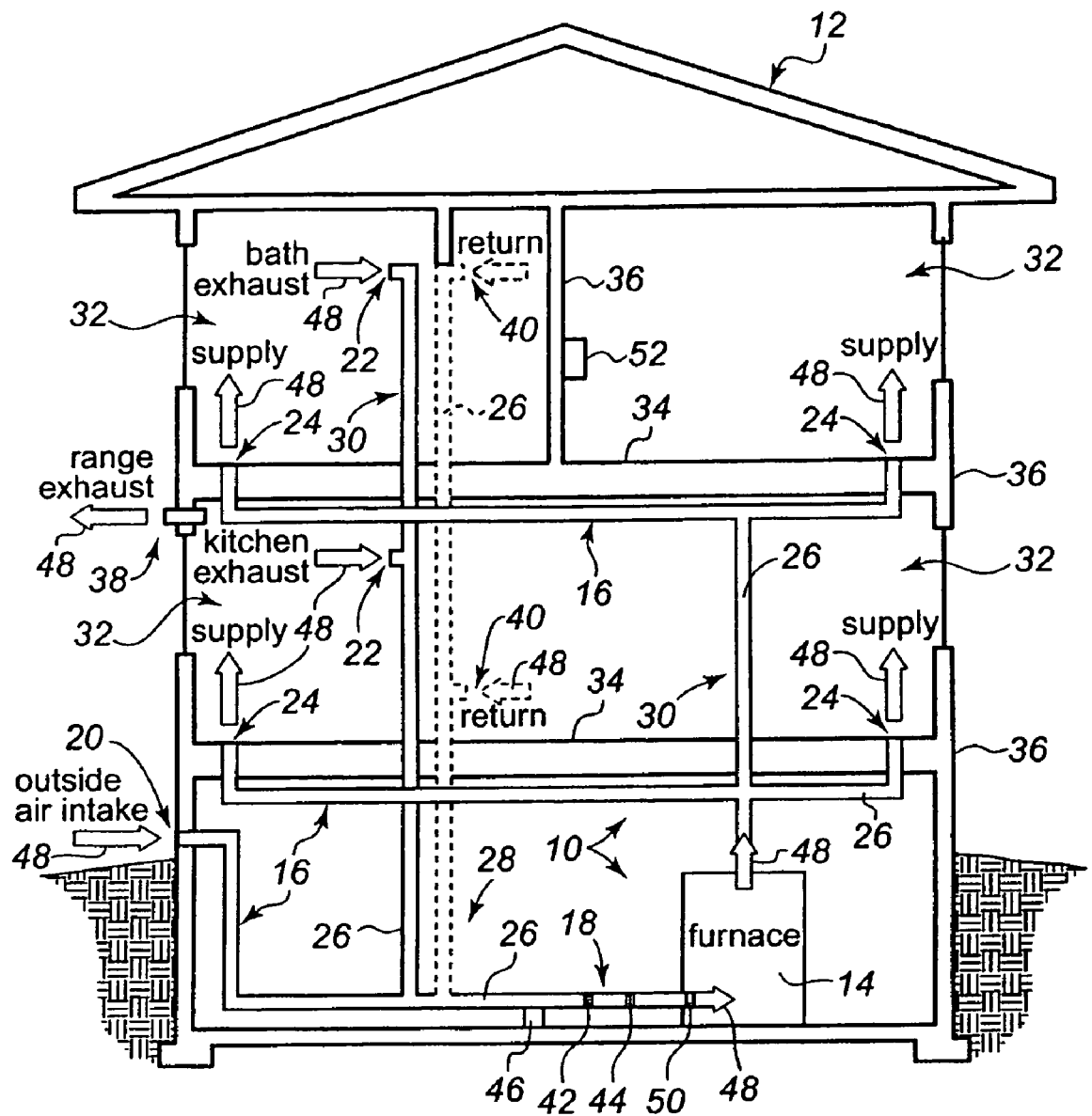
FIG. 1 is a system diagram of an exemplary embodiment of an HVAC system for performing de-humidification constructed in accordance with the teachings of the present invention.

Referring to FIG. 1, an indoor air quality system 10 for a structure 12 (e.g., a residential dwelling, an office building, and the like) is illustrated. As will be explained in further detail below, the indoor air quality system 10 can efficiently and cost effectively clean and circulate air through the structure 12. The indoor air quality system 10 comprises a heat exchanging appliance 14, a ventilation system 16, and one or more corona discharge apparatuses 18.

The heat exchanging appliance 14 transfers heat to, or absorbs heat from, the air flowing through the ventilation system 16. The heat exchanging appliance 14 can be a furnace, an air conditioner, or a combination of the two. The heat exchanging appliance 14 can operate using natural gas, liquefied petroleum gas (LPG), fuel oil, coal, electricity, wood, and the like.

The ventilation system 16 transports air through the structure 12. In that regard, the ventilation system 16 comprises one or more of an outside air intake 20, an internal exhaust 22, and a register 24 that are interconnected by a series of ducts 26 (i.e., conduits, passages, and the like). The ducts 26 direct and transport the air throughout the structure 12. The ducts 26 of the ventilation system 16 are generally referred to by portions with respect to their position relative to the heat exchanging appliance 14. For example, an upstream portion 28 of the ducts 26 is disposed upstream of the heat exchanging appliance 14 and a downstream portion 30 of the ducts is disposed downstream of the heat exchanging appliance. Preferably, the ducts 26 are constructed of a material such as stainless steel, plastic, and the like.

The outside air intake 20 is located in the upstream portion 28 of the ventilation system 16 and generally extends through the structure 12 to the outside environment. Therefore, the outside air intake 20 opens up to fresh air outside the structure 12. The outside air intake 20 is coupled to the heat exchanging appliance 14 by one of the ducts 26 to impart fluid communication between the two. Also, since it is exposed to the environment outside the structure 12, the outside air intake 20 can be covered and/or protected by a screen, grate, cover, and the like. As FIG. 1 shows, after being drawn in through the outside air intake 20, the fresh air is flowed through one of the ducts 26 in the ventilation system 16 toward the heat exchanging appliance 14.

The internal exhausts 22 are also located in the upstream portion 28 of the ventilation system 16. The internal exhausts 22 are coupled to, and placed in fluid communication with, the heat exchanging appliance 14 by one of the ducts 26. Preferably, each internal exhaust 22 opens up to a particular room 32 in the structure 12. These rooms 32 can include, for example, a bathroom, a kitchen, and the like. When employed or activated, the internal exhausts 22 are able to drawn air out of the room 32 and into one of the ducts 26. Therefore, for example, humid air can be exhausted from a bathroom, smoke-filled air can be pulled from the kitchen, and the like. As FIG. 1 depicts, after being drawn out of one of the rooms 32 the air is flowed through one of the ducts 26 in the ventilation system 16 toward the heat exchanging appliance 14.

The registers 24 are located in the downstream portion 30 of the ventilation system 16. The registers 24 are coupled to, and placed in fluid communication with, the heat exchanging appliance 14 by one of the ducts 26. Preferably, each of the registers 24 is placed in a particular room 32 in the structure 12. When opened and/or activated, the registers permit air from an associated duct 26 in the ventilation system 16 to be propelled into the room 32. The registers 24 can project slightly into the room 32, can be flush mounted in a floor 34 or wall 36 of the structure 12, and otherwise installed.

In one embodiment, the ventilation system 16 also includes one or more external exhausts 38. The external exhaust 38 is configured to exhaust air directly outside the structure 12 without passing through the heat exchanging appliance 14. The external exhaust 38 can be associated with, for example, a range used for preparing a meal. Therefore, smoke-filled air created by operation of the range can be immediately vented outside the structure 12.

In another embodiment, the ventilation system 16 further includes one or more returns 40. The returns 40 are coupled to, and placed in fluid communication with, the heat exchanging appliance 14 by one of the ducts 26 in the upstream portion 28. Preferably, each of the returns 40 is placed in a particular room 32 in the structure 12. Therefore, air can be vented out of one of the rooms 32, flowed through the duct 26 coupled to the return, and introduced into the heat exchanging appliance 14. These returns 40 are preferably positioned in close proximity to the floor so as to draw heavier cold air out of the room, particularly during winter months. Using the returns 40, the ventilation system 16 forms a complete circuit of air flow throughout the structure 12.

The corona discharge apparatus 18 is an electrical device that relies on corona discharge and ion charge attraction to move air and, preferably, filter particles and pollutants from the air. In the illustrated embodiment of FIG. 1, only one corona discharge apparatus 18 is shown in the duct 26 of the ventilation system 16 although more may be used. As illustrated in FIG. 1, the corona discharge apparatus 18 is preferably disposed in one of the ducts 26 in an upstream portion 28 of the ventilation system 16. In other words, the corona discharge apparatus 18 is found upstream of the heat exchanging appliance 14.

A typical corona discharge apparatus 18 employs numerous corona discharge electrodes 42 arranged in arrays and spaced apart from numerous negatively charged attracting electrodes 44 that are also arranged in arrays. When assembled into an array, the corona discharge electrodes 42 can be referred to as an emitter array. Likewise, the attracting electrodes 44 can be referred to a collector array. Due to the many array configurations and electrode shapes that can be used, the arrays of the corona discharge electrodes 42 and the attracting electrodes 44 have been shown in FIG. 1 in a simplified form.

Each of the corona discharge electrodes 42 and attracting electrodes 44 is coupled to and charged by a high-voltage power supply 46. The electrodes 42, 44 are also preferably controlled and/or managed by related control electronics (not shown). In addition, the corona discharge electrodes 42 are typically asymmetrical with respect to the attracting electrodes 44. In one embodiment, the corona discharge electrodes 42 are highly curved and resemble the tip of a needle or a narrow wire while the attracting electrodes 44 take the form of a flat plate or a ground plane. The curvature of the corona discharge electrodes 42 ensures a high potential gradient around that electrode.

The high potential gradient generated at or near the corona discharge electrodes 42 basically pulls apart the neutral air molecules in the immediate area. What remains after each neutral air molecule has been dismantled is a positively charged ion and a negatively charged electron. Due to the strong electric field near the corona discharge electrode 42, the ion and electron are increasingly separated from each other, prevented from recombining, and accelerated. Therefore, the ion and electron are both imparted with kinetic energy. Moreover, since a portion of the air molecules in the duct 26 is ionized, the air in the duct becomes a conducting medium, the circuit including the corona discharge electrodes 42 and the attracting electrodes 44 is completed, and a current flow can be sustained.

The negatively charged electrons are persuaded to move toward the positively charged corona discharge electrodes 42 due to the difference in charge between them. When the rapidly moving and accelerating electrons collide with other neutral air molecules in the area, further positive ion/electron pairs are created. As more and more positive/ion electric pairs are produced, an electron avalanche is established. The electron avalanche sustains and/or perpetuates the corona discharge process.

In contrast to the negatively charged electrons, the positively charged ions are persuaded to move from near the corona discharge electrodes 42 toward the attracting electrodes 44. This movement is due to the difference in charge between the positively charged ions and the negatively charged attracting electrodes. Like the electrons, when the positively charged ions move they also collide with neutral air molecules. When they collide, the positively charged ions can transfer some of their momentum as well as excess charge to the neutral air molecules. Therefore, the neutral air molecules are knocked toward the attracting electrode 44 or are ionized and then drawn to the attracting electrode. In either case, the positively charged ions and other air molecules end up flowing from the corona discharge electrodes 42 toward the attracting electrodes 44.

The movement or flow of the air particles away from the corona discharge electrodes 42 and toward the attracting electrodes 44 causes or results in what is referred to by those skilled in the art as an electric wind or electrostatic fluid acceleration. In the illustrated embodiment of FIG. 1, the electric wind travels through the duct 26 in a direction depicted by arrows 48.

In one embodiment, the velocity and volume of the air moving through the duct 26 is proportional to the voltage difference between the electrodes 42, 44 and the size of the arrays. By varying the potential between the electrodes 42, 44, the size and dimensions of the duct, and the like, the velocity and volume of the electric wind can be increased and decreased over a continuous range as desired. In any particular configuration, this range may be manually adjusted with a simple adjustment knob or remote control that varies the electric potential between the electrodes 42, 44. With the appropriate configuration, air flows exceeding six hundred cubic feet per minute are possible.

When the positively charged ions creating the electric wind reach the attracting electrodes 44, the positive charge is removed by permitting a recombination of the negatively charged electrons with the positively charged ions. Due to the recombination, neutral air molecules once again exist in the duct 26. Advantageously, these neutral air molecules retain their velocity and direction.

In a preferred embodiment, one or more corona discharge apparatuses 18 can be disposed within the duct 26 for the purpose of cleaning and scrubbing the air. Such beneficial and desirable filtering can be performed in addition to generating the electric wind. As known to those skilled in the art, contaminants and particles tend to adhere to the attracting electrode 44 during the corona discharge process. Therefore, the air passing through the duct 26 can be purified, undesirable substances such as pollen and dust can be removed and/or managed, and the like. The attracting electrodes 44, which are often plates, are preferably removable to permit inspection, cleaning, and replacement. In an alternative embodiment, the entire corona discharge apparatus 18 is removable.

As is known in the art, several patents and published applications have recognized that corona discharge devices may be used to generate ions and accelerate and filter fluids such as air. Such patents and published applications that describe fluid and/or air moving devices and technology include the following U.S. Pat. Nos. 3,638,058, 3,699,387, 3,751,715, 4,210,847, 4,231,766, 4,380,720, 4,643,745, 4,789,801, 5,077,500, 5,667,564, 6,176,977, 6,504,308, 6,664,741, and 6,727,657 and U.S. Pub. Pat. Applns. 2004/0217720, 2004/0212329, 2004/0183454, 2004/0155612, 2004/0004797, 2004/0004440, 2003/0234618, and 2003/0090209. The teachings and disclosure of each of these patents and published applications are incorporated in their entireties by reference thereto.

While other ion discharge or corona fluid movement technologies may be employed in the system and method of the present invention, a preferred embodiment of the present invention utilizes the technology described in one or more of the preceding patents and/or published applications, and most preferably, the technology described in U.S. Pat. Nos. 6,504,308, 6,664,741, and 6,727,657 issued to Kronos Advanced Technologies, Inc., of Belmont, Mass. The teachings and disclosure of each of these patents are also incorporated in their entireties by reference thereto.

In a preferred embodiment, the indoor air quality system 10 further comprises an ozone depletion apparatus 50 for reducing the amount of ozone in the air. In general, the ozone depletion apparatus 50 is any system, device, or method having the ability to degenerate ozone into oxygen (i.e., dioxide) and/or absorb ozone. In particular, the ozone depletion apparatus 50 can be a filter, a catalyst composition situated proximate the fluid, and the like. When the indoor air quality system 10 is equipped with the ozone depletion apparatus 50, the ozone generated by the one or more corona discharge apparatuses 18 can be maintained below a desired level, relegated to within a predetermined range, and otherwise managed.

While the ozone depletion apparatus 50 can be situated in a variety of different locations relative to the one or more corona discharge apparatuses 18, the ozone depletion apparatus is preferably disposed within the duct 26 in the upstream portion 28. In an exemplary embodiment, the ozone depletion apparatus 50 is in close proximity to, and generally downstream of, each of the corona discharge apparatuses 18. As such, air flowing out of through the ducts 26 of the ventilation system 16 is purified by the ozone depletion apparatus 50 prior to entering rooms 32 (e.g., an environment) within the structure 12.

As is known in the art, several patents have recognized that ozone depletion devices and systems may be used to convert ozone to oxygen, absorb ozone, and the like. Such patents that describe converting and absorbing devices, methods, and technology include the following U.S. Pat. Nos. 4,343,776, 4,405,507, 5,422,331, 6,375,902, 6,375,905, and 6,699,529. The teachings and disclosure of each of these patents and published applications are incorporated in their entireties by reference thereto.

Preferably, the indoor air quality system 10 includes one or more control components 52 to control the operation and features of the indoor air quality system and, in particular, the corona discharge apparatuses 18. The control components 52 are preferably located in a manner permitting easy access for a user such as on the wall 36 of the structure 12. The control components 52 take the form of, for example, a thermostat having one or more knobs, switches, depressible buttons, rotating dials, touch screens, and the like.

Figure 2:
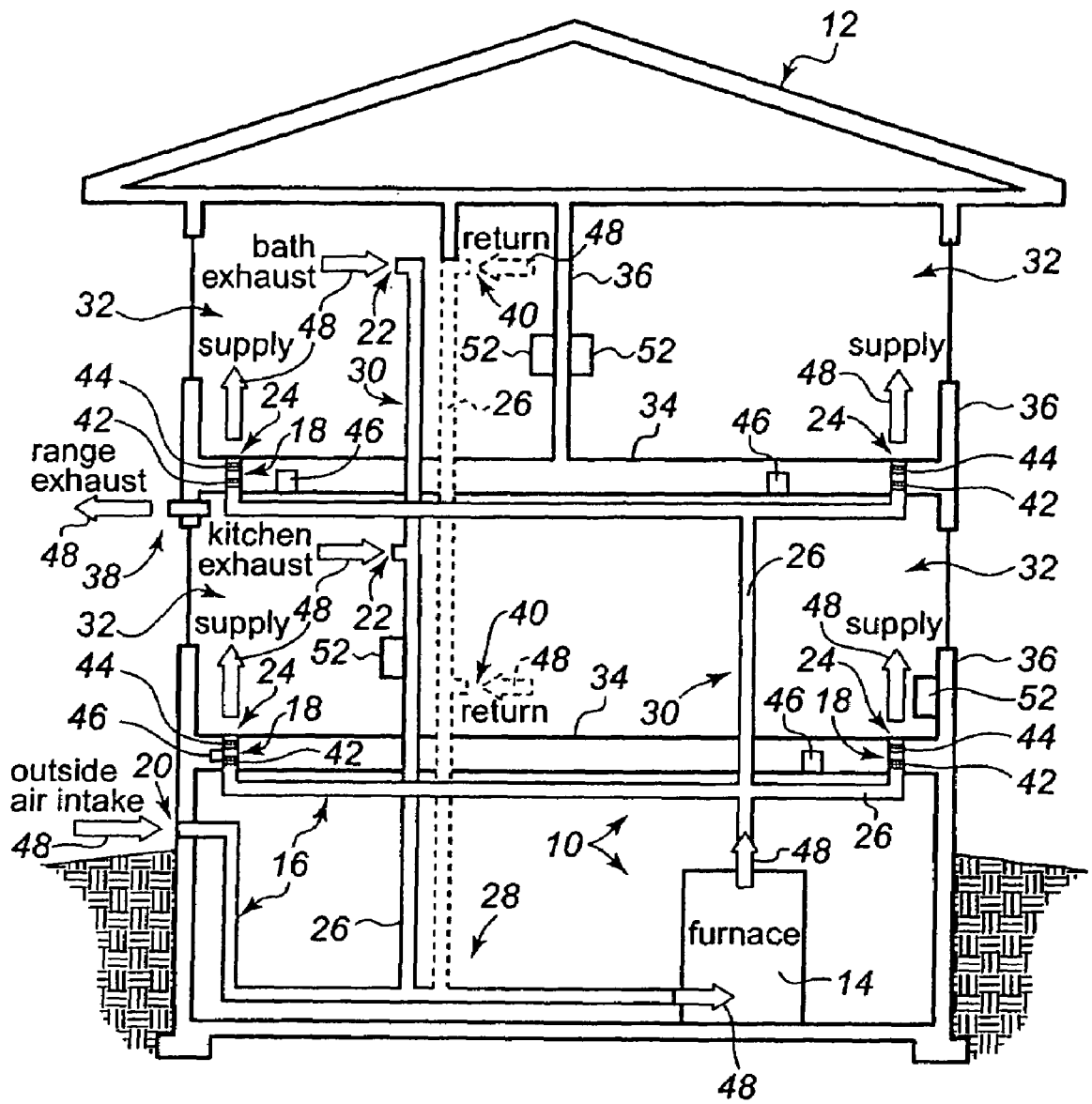
FIG. 2 is a system diagram of a further alternate embodiment of an HVAC system utilizing a distributed register based system constructed in accordance with the teachings of the present invention.

In an alternate embodiment, as illustrated in FIG. 2, the indoor air quality system 10 includes one of the corona discharge apparatuses 18 disposed in each of the registers 24. Each corona discharge apparatus 18 is preferably individually controlled by a thermostat 52 such that each of the individual rooms can be separately environmentally controlled. In that regard, the individual thermostats 52 are preferably in the same room 32 as the corona discharge apparatus 18 that particular thermostat controls. Alternatively, a single thermostat can selectively and individually control each of corona discharge apparatuses 18. Therefore, even though the indoor air quality system 10 can be focused on central air systems and whole house IAQ as illustrated in FIG. 1, it is possible to realize the further application and use of corona discharge apparatuses 18 in a distributed register based system such as depicted in FIG. 2.

In the embodiment illustrated in FIG. 2, the corona discharge apparatuses 18 are preferably sized to fit at or in the register 24 in each room 32 or space. The individual corona discharge apparatuses 18 in each register 24 would provide the benefit of better airflow and temperature regulation within that particular space. In addition, as will be recognized by those skilled in the art, the embodiments of FIGS. 1 and 2 could be combined to derive further benefit when moving, circulating, and cleaning the air in the structure 12.

In operation, and referring to FIG. 1, when it is determined that the IAQ is unacceptable, the corona discharge apparatus 18 is activated. The activated corona discharge apparatus 18 draws fresh air from outside the structure 12 through the outside air intake 20 and into a duct 26 in the upstream portion 28 of the ventilation system 16. In the duct 26 of the upstream portion 28, the fresh air generally encounters and blends with air from the one or more of the internal exhausts 22 and/or returns 40.

When the combined air reaches the corona discharge apparatus 18, the corona discharge apparatus cleans and/or filters the air to remove allergens, pollutants, and the like. Although only a single corona discharge apparatus 18 is shown in FIG. 1, more than one of the corona discharge apparatuses can be employed to move and/or clean the air. Therefore, the velocity and volume of the electric wind as well as the level of filtering of the air can be tailored as desired.

After the fresh air has been filtered, the filtered air enters the heat exchanging appliance 14 where one or more qualities of the air (e.g., temperature, humidity, and the like) are manipulated. Thereafter, the air is expelled from the heat exchanging appliance 14 into one of the ducts 26 in the downstream portion 30 of the ventilation system 16. Once in the downstream portion 30, the air is distributed via the ducts 26 and the registers 24 into one or more of the rooms 32 in the structure 12. The distributed air either heats or cools the room, reduces or increases the humidity level of the room, and the like.

Eventually, the air in the rooms 32 is drawn from the rooms 32 through the returns 40 and, once again, enters the upstream portion 28 of the ventilation system 16. The air then flows toward the heat exchanging appliance 14 where the cycle can begin anew. If the air is still stale or stagnant, further fresh air can be drawn through the outside air intake 20 and infused with the previously distributed and collected air. Additionally, undesirable air can be exhausted directly outside the structure 12, without passing that air through the heat exchanging appliance 14, by activating the external exhaust 38. In general, the air circulates and/or moves through the structure as illustrated by arrows 48. Therefore, the air inside the structure 12 can be continually circulated, filtered and selectively supplemented with fresh, clean air to improve the IAQ.

As shown in FIG. 2, the circulation of air is accomplished in basically the same manner. The corona discharge apparatuses 18 are used to create an electric wind and filter the air proximate their respective registers 24. Since each corona discharge apparatus 18 and register 24 can be individually controlled and/or thermostatically controlled, the environmental conditions in each room 32 can be specifically adjusted. Again, such circulation and cleaning of the air improves the IAQ.

The corona discharge apparatuses 18 can be dispersed in various places within the ducts 26, in addition to the positions illustrated in FIGS. 1 and 2, to beneficially circulate air throughout the structure.

From the foregoing, those skilled in the art will appreciate that the invention provides an indoor air quality system that can efficiently and cost effectively clean and circulate air through the structure 12 and, as a result, improve IAQ and reduce the chance of sick building syndrome.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any nonclaimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An indoor air quality system positioned in a building, the indoor air quality system comprising:
   a ventilation system for directing air through the building, the ventilation system including an outside air intake exposed to an environment outside of the building;
   at least one corona discharge apparatus within the ventilation system, the corona discharge apparatus operable to filter the air and to move the air through the ventilation system; and
   wherein the corona discharge apparatus is operable to draw fresh air from outside the building though the outside air intake and to filter the fresh air.

2. The indoor air quality system of claim 1, wherein the ventilation system includes a return, and wherein the corona discharge apparatus is operable to draw the stale air from inside the structure through the return.

3. The indoor air quality system of claim 1, wherein at least one electrode in the corona discharge apparatus is removable from the ventilation system for at least one of inspection, cleaning, and replacement.

4. The indoor air quality system of claim 1, further comprising a heat exchanging appliance in fluid communication with the ventilation system, and wherein at least one of the corona discharge apparatus is positioned downstream of the heat exchanging appliance.

5. An indoor air quality system positioned in a building, the indoor air quality system comprising:
a ventilation system for directing air through the building, the ventilation system including a duct terminating at a register, and the duct including a fresh air intake exposed to an environment outside of the building for drawing in air from outside the building and;
at least one corona discharge apparatus within the ventilation system, the corona discharge apparatus operable to filter the air and to move the air through the ventilation system; and
wherein the corona discharge apparatus is disposed in the ventilation system proximate a register to force air from the duct into the building.

6. The indoor air quality system of claim 5, further comprising means operatively coupled to the corona discharge apparatus for varying a flow rate of the air through the ventilation system.

7. The indoor air quality system of claim 5, further comprising an ozone depletion apparatus positioned downstream of the corona discharge apparatus for reducing ozone from the air.

8. The indoor air quality system of claim 5, wherein the corona discharge apparatus is removably positioned within the ventilation system to allow cleaning thereof.

9. The indoor air quality system of claim 5, wherein the corona discharge apparatus is configured to move the air through the ventilation system at up to about six hundred cubic feet per minute when energized.

10. An indoor air quality system for a structure, the indoor air quality system comprising:
a ventilation system for directing air through the structure, the ventilation system including an outside air intake;
at least one corona discharge apparatus within the ventilation system, the corona discharge apparatus operable to filter the air and to move the air through the ventilation system;
wherein the corona discharge apparatus is operable to draw fresh air from outside the structure though the outside air intake and to filter the fresh air; and
a heat exchanging appliance in fluid communication with the ventilation system, and wherein at least one of the corona discharge apparatus is positioned upstream of the heat exchanging appliance.

11. The indoor air quality system of claim 10, wherein the ventilation system includes at least one exhaust, and wherein the corona discharge apparatus is operable to draw stale air from inside the building through the exhaust and into the ventilation system.

12. The indoor air quality system of claim 10, wherein the corona discharge apparatus comprises an emitter array in spaced relation to a collector array.

13. The indoor air quality system of claim 10, wherein at least one of the corona discharge apparatus is positioned downstream of the heat exchanging appliance.

14. The indoor air quality system of claim 10, further comprising a thermostat operatively coupled to the corona discharge apparatus and to the heat exchanging appliance to control operation thereof.

15. The indoor air quality system of claim 10, wherein at least one electrode in the corona discharge apparatus is removable from the ventilation system for at least one of inspection, cleaning, and replacement.

16. An indoor air quality system positioned in a building, the indoor air quality system comprising:
a ventilation system including a duct extending to an outside air intake exposed to an environment outside of the building, the outside air intake capable of receiving fresh air from outside the building; and
a corona discharge apparatus positioned within the ventilation system, the corona discharge apparatus operable to draw the fresh air from outside the building and stale air from inside the building into the ventilation system, to filter the fresh air and the stale air to produce filtered air, and to move the filtered air through the ventilation system.

17. The indoor air quality system of claim 16, wherein the corona discharge apparatus comprises a positively charged emitter array and a negatively charged collector array in spaced relation to the positively charged emitter array, the positively charged emitter array and the negative charged collector array cooperatively producing an electric wind in the ventilation system.

18. The indoor air quality system of claim 17, wherein the indoor air quality system further comprises a second positively charged emitter array and a second negatively charged collector array in spaced relation to the second positively charged emitter array, the second positively charge emitter array and the second negatively charged collector array disposed proximate at least one of a register and a heat exchanging appliance.

19. A method of improving air quality in a building, the method comprising the steps of:
drawing fresh air from outside the building into the building using a corona discharge apparatus;
drawing stale air from inside the building;
filtering the fresh air and the stale air with the corona discharge apparatus to remove at least one of contaminants and pollutants to produce filtered air; and
circulating the filtered air through the building with the corona discharge apparatus such that the air quality in the building is improved.

20. The method of claim 19, wherein the method further comprises the step of reducing a level of ozone in the filtered air.

* * * * *